United States Patent [19]
Goodnight

[11] Patent Number: 6,022,292
[45] Date of Patent: Feb. 8, 2000

[54] METHOD OF ADJUSTING AN ENGINE LOAD SIGNAL USED BY A TRANSMISSION CONTROLLER

[75] Inventor: Trent Lynn Goodnight, Waterloo, Iowa

[73] Assignee: Deere & Company, Moline, Ill.

[21] Appl. No.: 09/250,780

[22] Filed: Feb. 12, 1999

[51] Int. Cl.⁷ .................................................... F15H 59/34
[52] U.S. Cl. ............................................ 477/121; 477/115
[58] Field of Search .................................... 477/121, 156, 477/164, 115, 120; 74/11; 701/50, 53, 54

[56] References Cited

U.S. PATENT DOCUMENTS 5,778,329   7/1998   Officer et al. ..................... 477/156 X

*Primary Examiner*—Charles A. Marmor
*Assistant Examiner*—Ankur Parekh

[57] ABSTRACT

A vehicle transmission controller responds of a load signal representing a load on the vehicle engine. The load signal is automatically and repeatedly adjusted as a function of an operational status of the auxiliary vehicle function, and the load signal is automatically adjusted during a shift of the transmission.

14 Claims, 4 Drawing Sheets

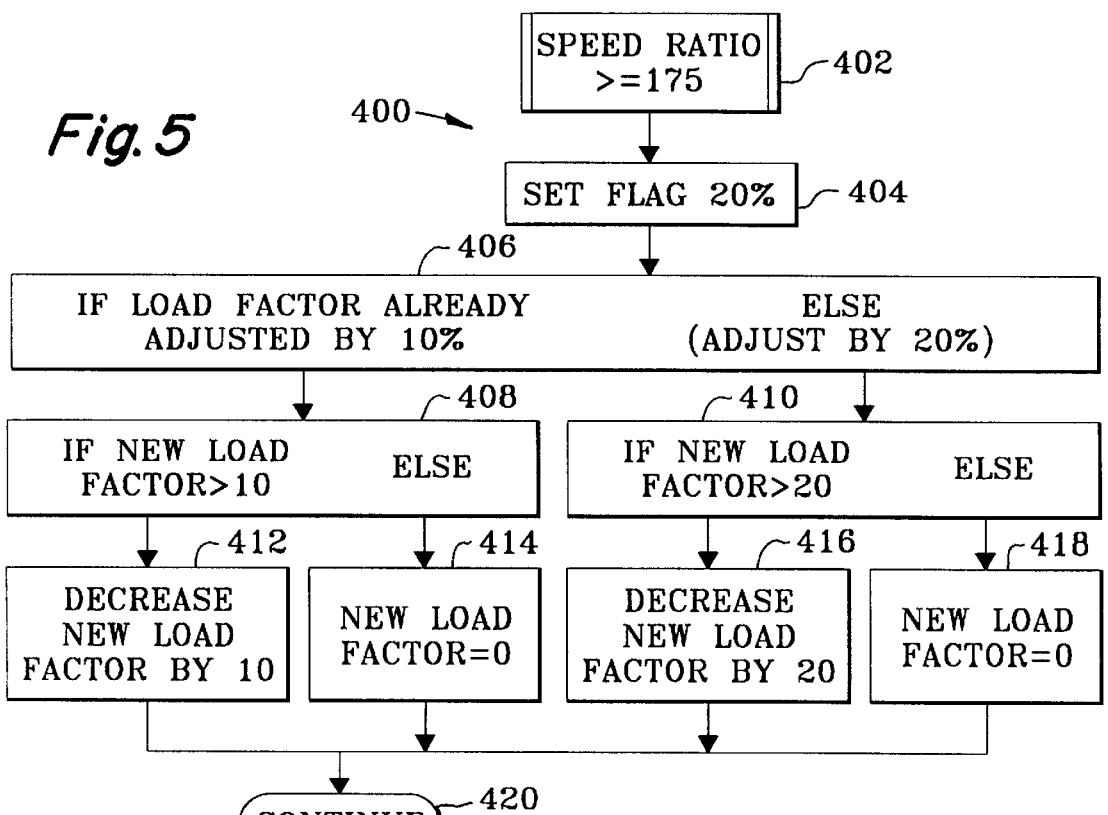
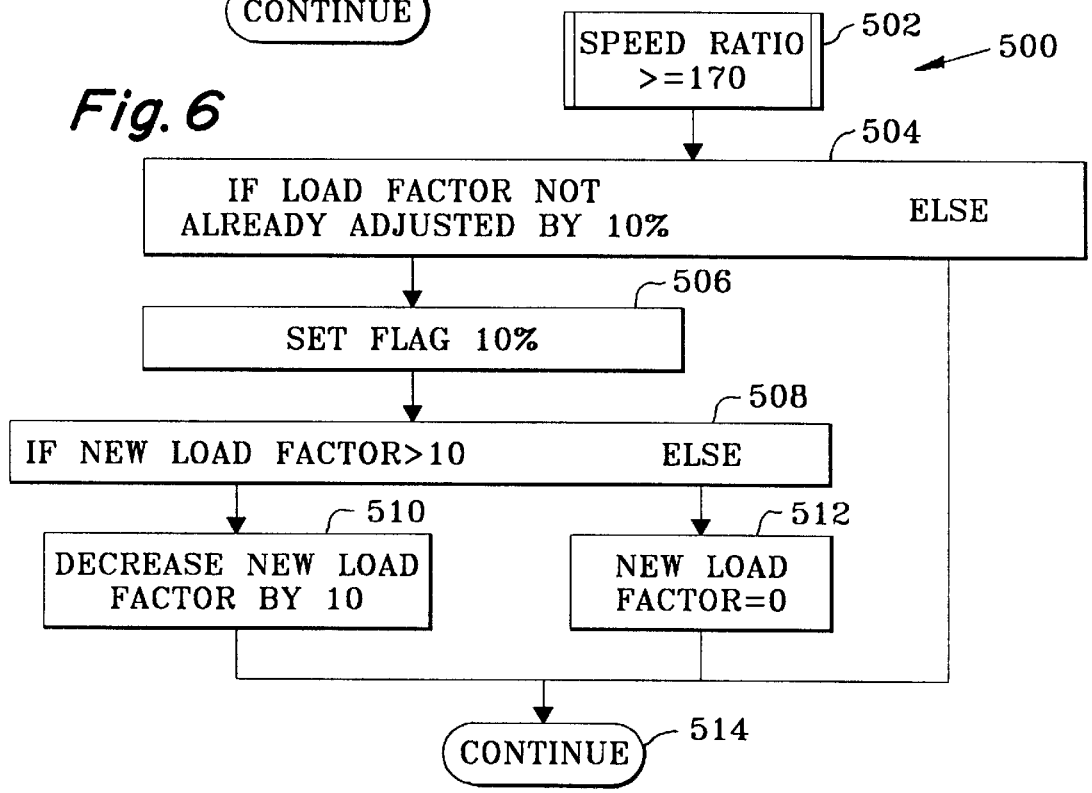

METHOD OF ADJUSTING AN ENGINE LOAD SIGNAL USED BY A TRANSMISSION CONTROLLER

BACKGROUND OF THE INVENTION

The invention relates to a vehicle transmission shift control system, and more particularly, to adaptive load-based powershift transmission shift control system which responds to various conditions, including the functional status of an auxiliary function driven by the engine.

A known production tractor, such as a John Deere 8000 series tractor, includes a powershift transmission (PST) controlled by a plurality of solenoid operated transmission clutch control valves, a power take off (PTO) controlled by a solenoid operated clutch. These and other functional elements are controlled by microprocessor-based vehicle control unit (VCU). Such a known production tractor also includes a conventional hitch operated by a solenoid operated hitch control valve and a plurality of solenoid operated selective control valves (SCV). The hitch solenoid and the SCV solenoid are controlled by a microprocessor-based hitch and SCV control unit which communicates with the vehicle control unit (VCU) by a conventional commercially available data bus. The commercially available VCU executes a shift control program which controls the shifting of the PST from one gear to another by controlling pressure applied to the transmission control clutches as a function of, among other things, the load as represented by the fuel flow or load signal from an electronic engine control unit (ECU). To achieve smooth shifts, generally, a higher clutch pressure is used under high load conditions, and a lower clutch pressure is used under lower load conditions.

However, when the engine is driving auxiliary functions, such as the PTO or one or more SCVs, the load signal from the ECU will not accurately represent the load which is actually applied to the transmission. This can adversely effect the smoothness of certain shifts. The production John Deere 8000 series tractor includes a diagnostic mode feature wherein the operator can manually adjust the load signal factor to compensate for the effects of operation of an auxiliary function. However, with this diagnostic mode feature, the compensation cannot be automatically or rapidly modified to adjust for rapidly changing circumstances, nor can the compensation be modified during an actual shift of the transmission.

SUMMARY OF THE INVENTION

Accordingly, an object of this invention is to provide a load responsive powershift transmission control system wherein the load factor is automatically adjusted in response to sensed conditions.

A further object of the invention is to provide such a powershift transmission control system wherein the load factor is automatically adjusted during a shift of the transmission.

These and other objects are achieved by the present invention wherein a vehicle transmission controller responds to a load signal representing a load on the vehicle engine, and the load signal is automatically and repeatedly adjusted as a function of an operational status of the auxiliary vehicle function, and the load signal is automatically adjusted during a shift of the transmission.

BRIEF DESCRIPTION OF THE DRAWINGS

FIGS. 3–6 are is logic flow diagrams of subroutines which are part of the adaptive load factor adjustment algorithm of FIG. 2.

DETAILED DESCRIPTION

Figure 1:
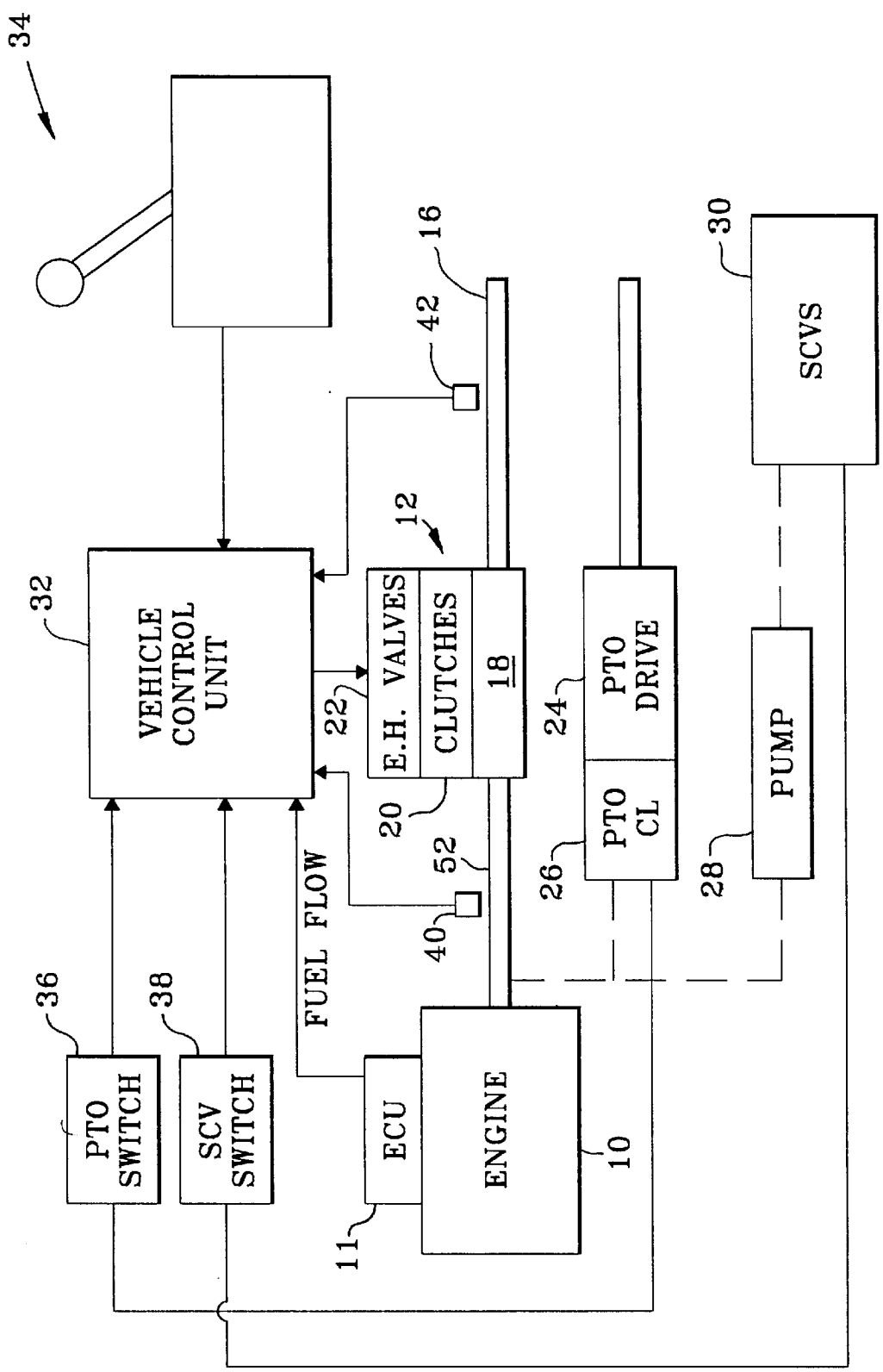
FIG. 1 is a schematic block diagram of a transmission control system to which the present invention is applicable.

Referring to FIG. 1, a vehicle power train includes an engine 10 (controlled by an electronic engine control unit 11, such as on the production John Deere 8000 series tractors) which drives a power shift transmission 12, which drives an output drive shaft 16 which is connected to drive wheels (not shown). The power shift transmission (PST) 12 includes a transmission 18 which is operated by a set of pressure operated control elements or clutches 20 which are controlled by a corresponding set of solenoid operated proportional control valves 22. The transmission 18 may be a powershift transmission such as available on the production John Deere 8000 Series tractor, and as described in U.S. Pat. No. 5,011,465, issued Apr. 30, 1991 to Jeffries et al., and assigned to the assignee of this application. The valves 22 may be two-stage electrohydraulic valves, such as are also on the production John Deere 8000 Series tractor, and as described in U.S. Pat. No. 4,741,364, issued May 3, 1988 to Stoss et al. and assigned to applicant's assignee. The engine 10 also drives a conventional power take off (PTO) drive 24 via PTO clutch 26, and drives a hydraulic pump 28 which supplies pressurized hydraulic fluid to a selective control valves (SCV) 30, all also as available on the production John Deere 8000 Series tractor.

A vehicle control unit (VCU) 32, preferably one or more microprocessor-based electronic control units, controls shifting of the PST 12, and other functions, in response to signals supplied to it by other components. A shift control lever unit 34, such as described in U.S. Pat. No. 5,406,860, supplies a gear command signal. A PTO switch unit 36, such as described in U.S. Pat. No. 5,380,964, supplies a PTO on/off signal. An SCV switch 38, such as described in U.S. Pat. No. 5,343,775, supplies an SCV on/off signal. Other function control devices (not shown) may be supplied to control activation and deactivation of various other functions which are driven or powered by the engine 10. The ECU 11 supplies a fuel flow signal which represents the load on the engine. An engine speed sensor 40, preferably a mag pick-up, supplies an engine speed signal. An axle speed sensor 42, preferably a Hall effect sensor, supplies an axle speed signal. Components 32–42 are preferably similar to their counterparts found on the production John Deere 8000 series tractors, but similar commercially available components could also suffice. Other load sensing devices (not shown), such as torque sensors, may be supplied to provide a signal representative of the load on the engine 10.

The known VCU 32, as used on the production John Deere 8000 series tractors, controls shifting of the PST 12. To summarize, the commercially available VCU executes a shift control program (not shown) which controls the shifting of the PST from one gear to another by controlling pressure applied to the transmission control clutches 20 as a function of, among other things, the load as represented by the fuel flow or load signal from the ECU 11 and a load factor value. To achieve smooth shifts, generally, a higher clutch pressure is used under high load conditions, and a lower clutch pressure is used under lower load conditions. The load factor value can be set by a dealer or an operator using a diagnostic procedure built into the tachometer of the commercially available John Deere 8000 series tractors.

Figure 2:
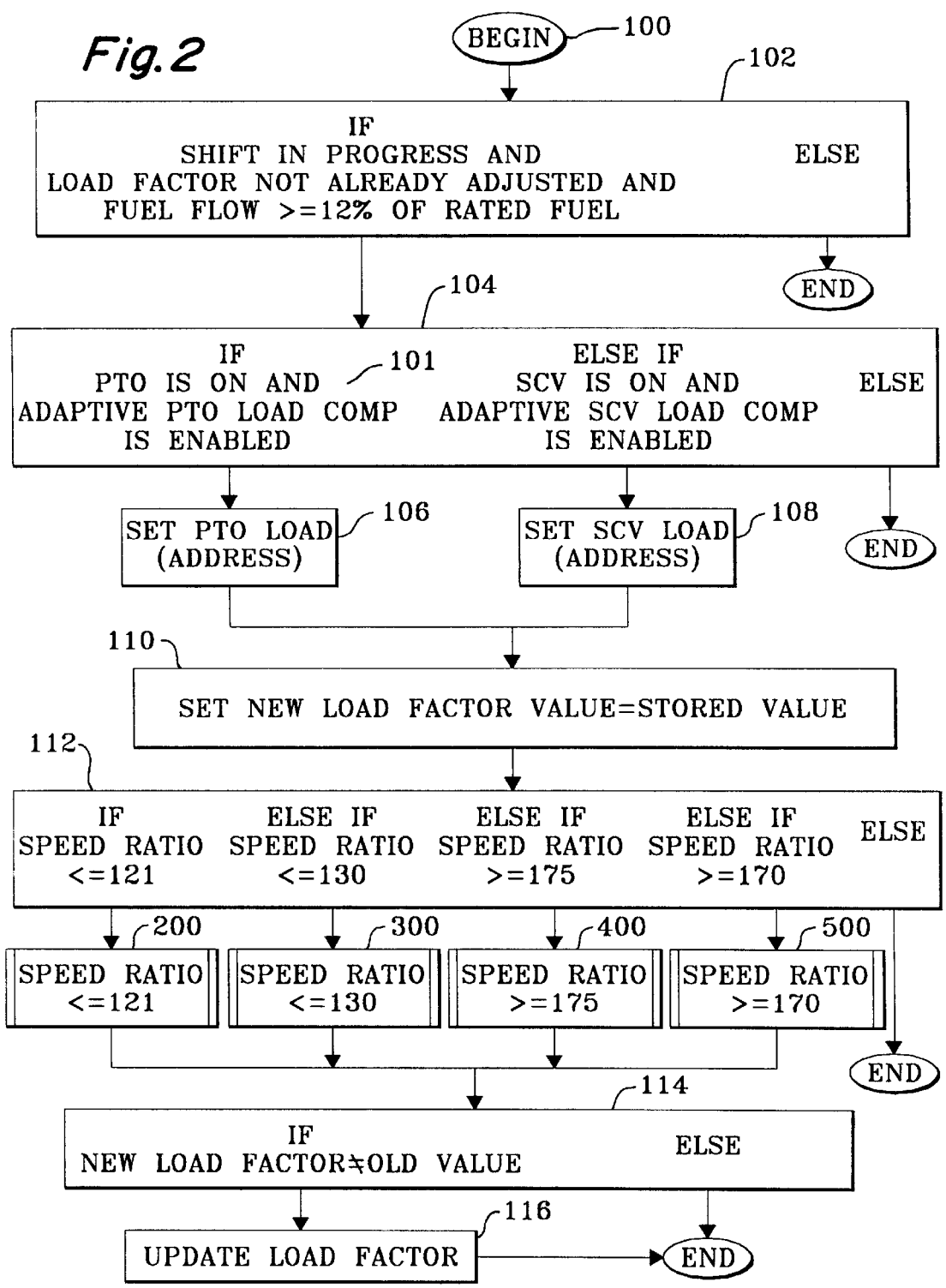
FIG. 2 is a logic flow diagram of an adaptive load factor adjustment algorithm according to the present invention.

Now, according to the present invention, the load factor is automatically and repeatedly adjusted as a function of the operational status of auxiliary engine driven functions, such as the PTO and SCVs, is automatically and repeatedly adjusted during the progress of a transmission gear shift, and as a function of other conditions and parameters. For this purpose, the VCU 32 executes an adaptive load factor adjustment algorithm 100 shown in FIG. 2.

The adaptive PTO/SCV load factor adjustment algorithm 100 is entered at step 101. Step 102 determines if a particular shift of the transmission 12 (which would benefit from this process) is in progress, if the PTO/SCV load factor has not already been adjusted by 20%, and if engine fuel flow (provided by ECU 11) is greater than or equal to 12% of the rated fuel flow for the engine 10. If any of these conditions are not met, step 102 ends the algorithm. If all of these conditions are met, step 102 directs the algorithm to step 104.

Step 104 operates as follows: If the PTO switch 36 is on and adaptive PTO load compensation is enabled (such as by an operator actuated switch or by the entering of a code), it directs control to step 106; else if the SCV switch 38 is on and adaptive SCV load compensation is enabled (such as by an operator actuated switch or by the entering of a code), it directs control to step 108. Otherwise, step 104 ends the algorithm.

Step 106 establishes PTO_LOAD as a PTO load factor address in a memory of the control unit 32 and directs the algorithm to step 110. Step 108 establishes SCV_LOAD as an SCV load factor address in a memory of the control unit 32 and directs the algorithm to step 110.

Step 110 sets a new load factor value, new_load_factor, to a previously stored value.

Step 112 operates as follows: A speed ratio value SR is determined as the ratio of engine speed (from sensor 40) to transmission output speed (from sensor 42). If SR is less than or equal to 121, it directs control to subroutine 200; else if SR is less than or equal to 130, it directs control to subroutine 300; else if SR is greater than or equal to 175, it directs control to subroutine 400; else if SR is greater than or equal to 170, it directs control to subroutine 500. Otherwise, step 112 ends the algorithm. Subroutines 200–500 determine a new load factor value, as will be described later in detail, and then return control to step 114 of the adaptive PTO/SCV load factor adjustment algorithm 100.

Step 114 operates as follows: if the new load factor value (returned by one of subroutines 200–500) is not equal to the previously stored load factor value, the load factor value "PTO/SCV_Load_Factor" is updated in step 116, else the adaptive PTO/SCV load factor adjustment algorithm 100 is ended. The updated load factor from step 116 is used by the commercially available VCU 32 in the execution of the shift control program (not shown). More specifically, the fuel flow load value (attributable to the load from the vehicle axles) "Fuel_Flow_Axles" is used to control transmission shifts, and is determined according to the following relationship:

Fuel_Flow_Axles=Total_Fuel_Flow-((Total_Fuel_Flow-No_Load_Fuel_Flow)*(PTO/SCV_Load_Factor/100)), where "Total_Fuel_Flow" is the fuel flow value from ECU 11, "No_Load_Fuel_Flow" is constant specific to a particular engine, and "PTO/SCV_Load_Factor" is the value determined by step 116.

For example, if Total_Fuel_Flow is 100% (tractor is fully loaded), and No_Load_Fuel_Flow is 20%, and PTO/SCV_Load_Factor is 80%, then Fuel_Flow_Axles=100-((100-20)*80/100)=36%.

Figure 3:
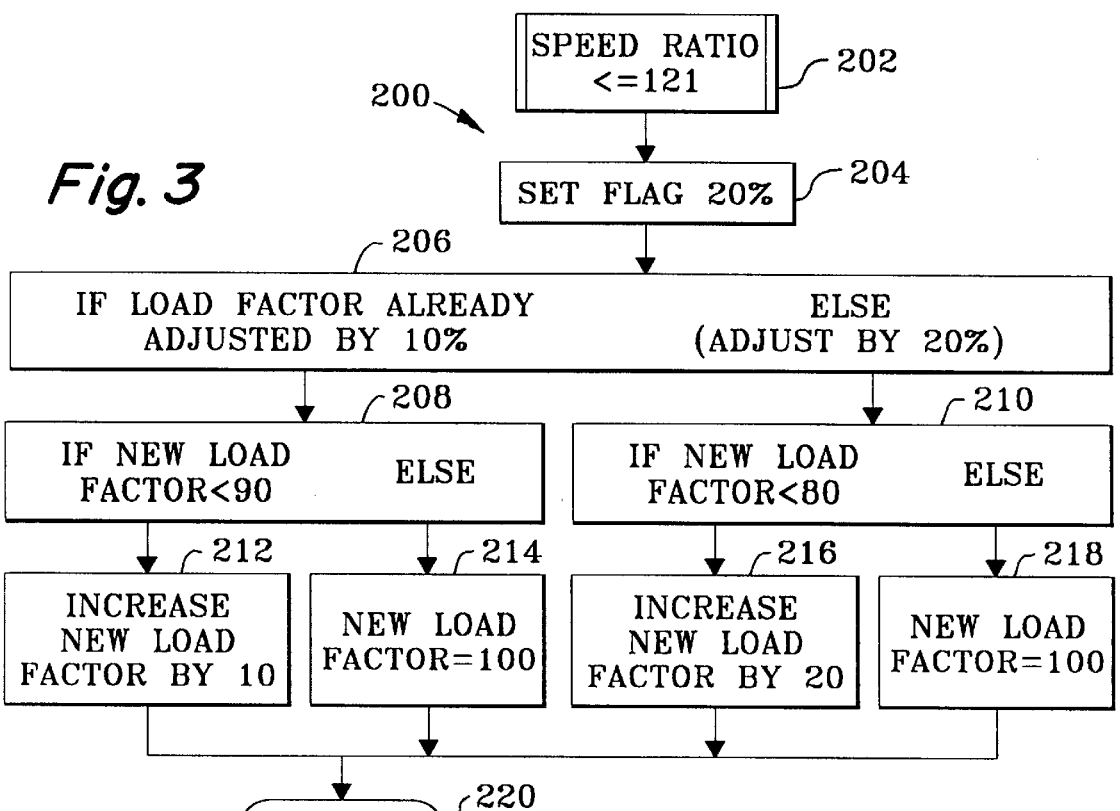

Turning now to FIG. 3, subroutine 200 is entered at step 202. Step 204 sets a flag to indicate that the PTO/SCV load factor has previously been adjusted by 20% during this shift. Then step 206 operates as follows: If the PTO/SCV load factor has previously been adjusted by 10% during this shift, then it directs control to step 208; else control is directed to step 210.

In step 208, if the new load factor value is less than 90%, control is directed to step 212 which increases the new load factor value by 10; else control is directed to step 214 which sets the new load factor value equal to 100.

In step 210, if the new load factor value is less than 80, control is directed to step 216 which increases the new load factor value by 20; else control is directed to step 218 which sets the new load factor value equal to 100. From steps 212, 214, 216 and 218 control is directed to step 220 which returns control to step 114 of the adaptive load factor algorithm 100.

Figure 4:
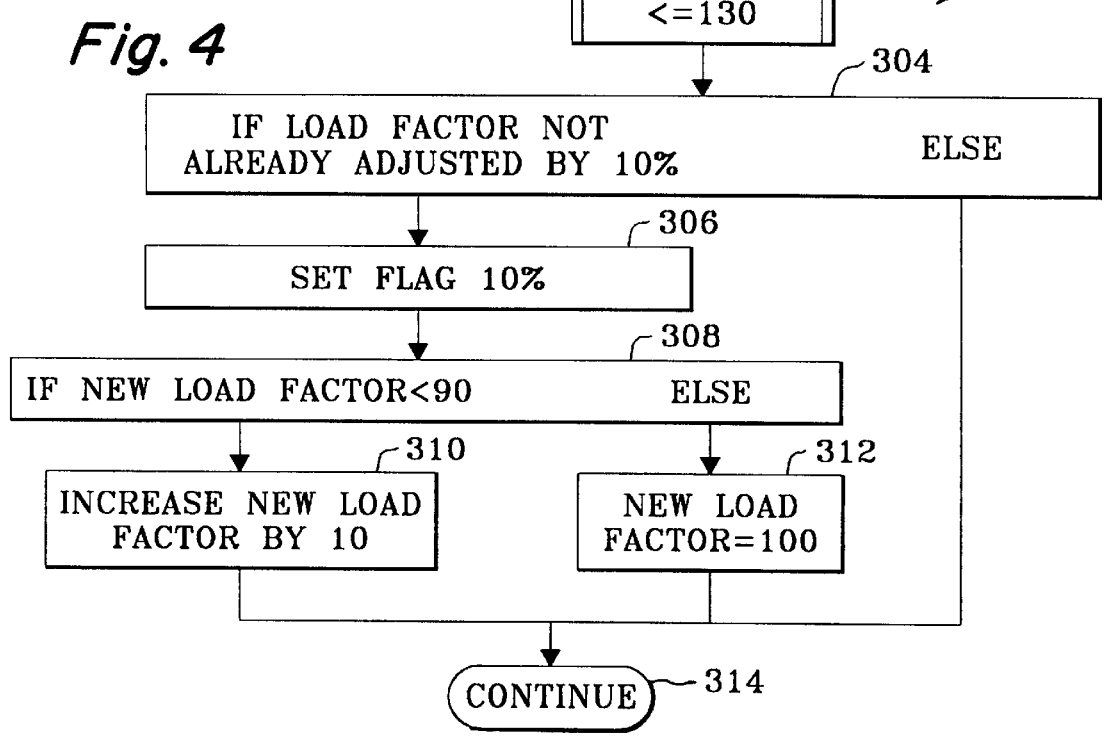

Turning now to FIG. 4, subroutine 300 is entered at step 302. Step 304 operates as follows: If the PTO/SCV load factor has not previously been adjusted by 10% during this shift, then it directs control to step 306; else control is directed to step 314.

Step 306 sets a flag to indicate that the PTO/SCV load factor has previously been adjusted by 10% during this shift.

Then, in step 308, if the new load factor value is less than 90, control is directed to step 310 which increases the new load factor value by 10; else control is directed to step 312 which sets the new load factor value equal to 100.

From steps 310 and 312 control is directed to step 314. Step 314 returns control to step 114 of the adaptive load factor algorithm 100.

Turning now to FIG. 5, subroutine 400 is entered at step 402. Then step 404 sets a flag to indicate that the PTO/SCV load factor has previously been adjusted by 20% during this shift. Then step 406 operates as follows: If the PTO/SCV load factor has previously been adjusted by 10% during this shift, then it directs control to step 408; else control is directed to step 410.

In step 408, if the new load factor value is greater than or equal to 10, control is directed to step 412 which decreases the new load factor value by 10; else control is directed to step 414 which sets the new load factor value equal to 0.

In step 410, if the new load factor value is greater than 20, control is directed to step 416 which decreases the new load factor value by 20; else control is directed to step 418 which sets the new load factor value equal to 0. From steps 412, 414, 416 and 418 control is directed to step 420 which returns control to step 114 of the adaptive load factor algorithm 100.

Turning now to FIG. 6, subroutine 500 is entered at step 502. Step 504 operates as follows: If the PTO/SCV load factor has not previously been adjusted by 10% during this shift, then it directs control to step 506; else control is directed to step 514.

Step 506 sets a flag to indicate that the PTO/SCV load factor has previously been adjusted by 10% during this shift.

Then, in step 508, if the new load factor value is greater than 10, control is directed to step 510 which decreases the new load factor value by 10; else control is directed to step 512 which sets the new load factor value equal to 0.

From steps 510 and 512 control is directed to step 514. Step 514 returns control to step 114 of the adaptive load factor algorithm 100.

The conversion of the above flow charts into a standard language for implementing the algorithm described by the flow chart in a digital computer or microprocessor, will be evident to one with ordinary skill in the art.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a vehicle having an engine, a transmission driven by the engine and shiftable among a plurality of gears in response to hydraulic pressure applied to shift control clutches, an auxiliary function driven by the engine, a transmission controller for controlling pressure applied to the shift control clutches as a function of a load signal representing a load on the engine, a method of adjusting the load signal to which the transmission controller responds, comprising:

automatically and repeatedly determining a variable load factor value as a function of an operational status of the auxiliary function; and adjusting the load signal used by the transmission controller as a function of the variable load factor value;

controlling modification of the load factor value as a function of previous modifications of the load factor value.

2. The method of claim 1, further comprising:

determining a speed ratio value representing a ratio of engine speed to transmission output speed; and modifying the load factor value as a function of the speed ratio value.

3. The method of claim 2, further comprising:

increasing the load factor value if the speed ratio is not greater than a certain value.

4. The method of claim 2, further comprising:

decreasing the load factor value if the speed ratio is not less than a certain value.

5. The method of claim 2, further comprising:

preventing modification of the load factor value if the speed ratio is within a range of values.

6. The method of claim 2, further comprising:

increasing the load factor value if the speed ratio is not greater than a first value;

decreasing the load factor value if the speed ratio is not less than a second value; and preventing modification of the load factor value if the speed ratio is between the first and second values.

7. The method of claim 1, wherein said vehicle further comprises an operator controlled function switch for activating and deactivating said auxiliary function, the method further comprising:

controlling modification of the load factor value as a function of a status of the operator controlled function switch.

8. In a vehicle having an engine, a transmission driven by the engine and shiftable among a plurality of gears, an auxiliary function driven by the engine, a transmission controller for controlling shifts as a function of a load signal representing a load on the engine, a method of adjusting the load signal to which the transmission controller responds, comprising:

determining a variable load factor value as a function of an operational status of the auxiliary function;

determining a speed ratio value representing a ratio of engine speed to transmission output speed;

modifying the load factor value as a function of the speed ratio value; and adjusting the load signal used by the transmission controller as a function of the variable load factor value.

9. The method of claim 8, further comprising:

increasing the load factor value if the speed ratio is not greater than a certain value.

10. The method of claim 8, further comprising:

decreasing the load factor value if the speed ratio is not less than a certain value.

11. The method of claim 8, further comprising:

preventing modification of the load factor value if the speed ratio is within a range of values.

12. The method of claim 8, further comprising:

increasing the load factor value if the speed ratio is not greater than a first value;

decreasing the load factor value if the speed ratio is not less than a second value; and preventing modification of the load factor value if the speed ratio is between the first and second values.

13. The method of claim 8, further comprising:

controlling modification of the load factor value as a function of previous modifications of the load factor value.

14. The method of claim 8, wherein said vehicle further comprises an operator controlled function switch for activating and deactivating said auxiliary function, the method further comprising:

controlling modification of the load factor value as a function of a status of the operator controlled function switch.

* * * * *